(12) United States Patent
Cao et al.

(10) Patent No.: US 10,243,829 B2
(45) Date of Patent: Mar. 26, 2019

(54) COMMUNICATION PROTOCOL TESTING METHOD, AND TESTED DEVICE AND TESTING PLATFORM THEREOF

(71) Applicant: China IWNCOMM Co., LTD., Xi'an, Shaanxi (CN)

(72) Inventors: Jun Cao, Shaanxi (CN); Qin Li, Shaanxi (CN); Yuehui Wang, Shaanxi (CN); Yanan Hu, Shaanxi (CN); Qi Pan, Shaanxi (CN); Bianling Zhang, Shaanxi (CN)

(73) Assignee: China IWNCOMM Co., LTD., Xi'an, Shaanxi (CN)

( * ) Notice: Subject to any disclaimer, the term of this patent is extended or adjusted under 35 U.S.C. 154(b) by 121 days.

(21) Appl. No.: 15/309,861

(22) PCT Filed: Apr. 17, 2015

(86) PCT No.: PCT/CN2015/076825
§ 371 (c)(1),
(2) Date: Nov. 9, 2016

(87) PCT Pub. No.: WO2015/188659
PCT Pub. Date: Dec. 17, 2015

(65) Prior Publication Data
US 2017/0272353 A1    Sep. 21, 2017

(30) Foreign Application Priority Data
Jun. 10, 2014   (CN) .......................... 2014 1 0255349

(51) Int. Cl.
*G06F 15/173* (2006.01)
*H04L 12/26* (2006.01)
*H04L 29/06* (2006.01)

(52) U.S. Cl.
CPC ............ *H04L 43/50* (2013.01); *H04L 63/123* (2013.01); *H04L 63/1433* (2013.01)

(58) Field of Classification Search
CPC ....... H04L 1/24–1/244; H04L 29/00–29/0627; H04L 43/00–43/50;
(Continued)

(56) References Cited

U.S. PATENT DOCUMENTS 6,373,822 B1 *  4/2002  Raj .......................... H04L 1/243
                                                          370/241
6,668,282 B1   12/2003  Booth, III et al.
(Continued)

FOREIGN PATENT DOCUMENTS

| CN | 1777124 A | 5/2006 |
| CN | 1812418 A | 8/2006 |

(Continued)

OTHER PUBLICATIONS

International Search Report, dated Jul. 13, 2015, from corresponding International Application No. PCT/CN2015/076825.
(Continued)

*Primary Examiner* — Brendan Y Higa
(74) *Attorney, Agent, or Firm* — Wolf, Greenfield & Sacks, P.C.

(57) ABSTRACT

A communication protocol testing method, a tested device and a testing platform. The method includes: the tested device and the reference device execute a communication protocol, a message sent and/or received during execution of the communication protocol serving as a first message, and the first message being encapsulated in a data encapsulation format of the communication protocol; the tested device encapsulates a part of data or all the data in the first message and/or known data of the tested device according to a unified data encapsulation format to generate a second message; and
(Continued)

the testing platform acquires the second message, parses the acquired second message according to the unified data encapsulation format to obtain a part of data or all the data in the second message, executes testing items, and outputs testing results, thereby completing the test.

24 Claims, 5 Drawing Sheets

(58) Field of Classification Search
CPC ...... H04L 43/04; H04L 43/062–43/067; H04L 43/18; H04L 63/14–63/1433
See application file for complete search history.

(56) References Cited

U.S. PATENT DOCUMENTS

| | | | |
|---|---|---|---|
| 6,732,182 B1* | 5/2004 | Beverly, IV | H04L 12/18 370/244 |
| 6,832,184 B1 | 12/2004 | Bleier, Jr. et al. | |
| 9,166,909 B2* | 10/2015 | Chewter | H04L 43/00 |
| 2008/0137543 A1* | 6/2008 | Mitra | H04L 43/50 370/242 |
| 2011/0142057 A1* | 6/2011 | Deal | H04L 41/0806 370/401 |
| 2014/0269371 A1* | 9/2014 | Badea | H04L 63/0227 370/252 |
| 2016/0205090 A1 | 7/2016 | Hu et al. | |

FOREIGN PATENT DOCUMENTS

| | | |
|---|---|---|
| CN | 102098668 A | 6/2011 |
| CN | 102098702 A | 6/2011 |
| CN | 103378994 A | 10/2013 |
| CN | 103442383 A | 12/2013 |
| CN | 104009889 A | 8/2014 |
| EP | 1990958 A1 | 11/2008 |
| EP | 1990972 A1 | 11/2008 |
| EP | 2398188 A1 | 12/2011 |
| EP | 2629457 A1 | 8/2013 |

OTHER PUBLICATIONS

Chinese 1st Office Action for Application No. CN 201410255349.X dated Oct. 27, 2016.
Extended European Search Report for Application No. EP 15807391.6 dated Feb. 24, 2017.

* cited by examiner

COMMUNICATION PROTOCOL TESTING METHOD, AND TESTED DEVICE AND TESTING PLATFORM THEREOF

CROSS-REFERENCE TO RELATED APPLICATION

This application is the national phase of International Application No. PCT/CN2015/076825, titled "COMMUNICATION PROTOCOL TESTING METHOD, AND TESTED DEVICE AND TESTING PLATFORM THEREOF", filed on Apr. 17, 2015, which claims priority to Chinese Patent Application No. 201410255349.X, titled "COMMUNICATION PROTOCOL TESTING METHOD, AND TESTED DEVICE AND TESTING PLATFORM THEREOF", filed on Jun. 10, 2014 with the State Intellectual Property Office of the People's Republic of China, which applications are hereby incorporated by reference to the maximum extent allowable by law.

TECHNICAL FIELD

The present disclosure relates to the field of communication protocol testing, and in particular to a communication protocol testing method and a tested device and a testing platform thereof.

BACKGROUND

Network communication protocol is a set of specifications for ensuring network operation. With the diversification of network applications, more threats would be faced by the network, including leaking secret data, destroying data integrity, camouflaging identify and refusing a service supply. In order to alleviate those network threats, a network security protocol is proposed by researchers, for pertinently alleviating a network threat faced by a specific network communication protocol at a protocol level. In some existing solutions, security capacity is taken into consideration in the process of evolving and designing of a network communication protocol, and a network security communication protocol is initially inserted into the network communication protocol as requisite content.

To alleviate security threats faced by the network, technologies, such as encryption, integrity checking, signature and key exchange, are inevitably applied in the network security communication protocol, that is, a symmetric cryptographic algorithm and an asymmetric cryptographic algorithm are used.

In addition, main security threats faced by different network communication protocols have a similarity, and therefore different network communication security protocols also have a similarity. Security technologies under a same one technology architecture may be used by some of network communication protocols, therefore a series of network security protocols with many similar characteristics are proposed, and a series of network security products with many similar characteristics are proposed.

Before being put into use, all products meeting corresponding network security protocol should pass a corresponding network security protocol testing, in order to ensure the accuracy of protocol implementation and the interoperability of network products. Currently, the network security protocol testing is generally implemented by a method for analyzing a capture packet. A testing platform first captures a data packet received and transmitted by related devices (including a tested device) when executing the network security protocol, and then analyzes the captured data packet. This testing method cannot fully value and use common characteristics of current network security protocols, and each developed network security protocol testing platform is only applicable for a specific network security protocol and a conformity product thereof, that is, different testing systems are developed for testing different network security protocols, thereby decreasing development efficiency and increasing development cost.

SUMMARY

In order to solve the above technology problems mentioned in the background technology, a communication protocol testing method is provided according to the disclosure, for detecting the conformance of a communication protocol executed by a tested device or the accuracy and consistency of a cryptographic algorithm involved in the executed communication protocol. The method involves a testing platform, a tested device and a reference device, for detecting an execution situation of the tested device when the communication protocol is executed between the tested device and the reference device.

The communication protocol is executed between the tested device and the reference device. A message transmitted and/or received by the tested device when executing the communication protocol is referred to as a first message, and the first message is encapsulated in a data encapsulation format of the communication protocol.

The tested device encapsulates a part or all of data in the first message and/or data known to the tested device according to a unified data encapsulation format to generate a second message. The testing platform obtains the second message. The part or all of data in the first message includes data obtained by the tested device by parsing the received first message according to the communication protocol and/or data used by the tested device for constructing the transmitted first message.

The testing platform parses the obtained second message according to the unified data encapsulation format to obtain a part or all of data in the second message.

The testing platform executes testing items according to the part or all of data in the second message obtained by the parsing and outputs a testing result to complete the testing.

A tested device is further provided according to the disclosure, which includes a communication protocol executing module, a parsing module, an encapsulating module and a transmitting module.

The communication protocol executing module is configured to execute a communication protocol with a reference device. A message transmitted and/or received by the communication protocol executing module when executing the communication protocol is referred to as a first message, and the first message is encapsulated in a data encapsulation format of the communication protocol.

The parsing module is configured to parse the received first message according to the communication protocol to obtain data.

The encapsulating module is configured to encapsulate a part or all of data in the first message and/or data known to the tested device according to a unified data encapsulation format to generate a second message. The part or all of data in the first message includes data obtained by the parsing module by parsing the received first message and/or data used by the parsing module for constructing the transmitted first message.

The transmitting module is configured to transmit the second message to the testing platform.

In addition, a testing platform is further provided according to the disclosure, which includes an obtaining module, a parsing module, a testing module and an output module.

The obtaining module is configured to obtain a second message transmitted by a tested device.

The parsing module is configured to parse the obtained second message according to a unified data encapsulation format to obtain a part or all of data in the second message.

The testing module is configured to execute testing items according to the part or all of data in the second message obtained by the parsing.

The output module is configured to output a testing result provided by the testing module.

Based on the above solutions according to the disclosure, the tested device encapsulates the part or all of data in the first message and/or the data known to the tested device according to a unified data encapsulation format to generate a second message. The testing platform obtains the second message and parses the obtained second message according to the unified data encapsulation format to obtain a part or all of data in the second message. The testing platform executes testing items according to the part or all of data in the second message obtained by the parsing and outputs a testing result to complete the testing. Therefore, in detecting an execution situation of the tested device when a communication protocol, particularly a network security protocol having a common characteristic is executed between a tested device and a reference device, the development workload of a testing system is largely decreased and the reusability of the testing system is improved, thereby saving the development cost and improving the development efficiency.

Based on the technology solutions according to the disclosure, the communication protocol, particularly the network security protocol having a common characteristic is transparent for the testing platform, and the testing platform parses the obtained data according to the unified data encapsulation format, instead of according to a data encapsulation format defined by each network security protocol, thereby improving the execution efficiency of the testing platform.

Based on the technology solutions according to the disclosure, the testing platform does not need to capture data with tools for data capture, thereby reducing the complexity of the testing.

DETAILED DESCRIPTION OF THE EMBODIMENTS

Hereinafter, a communication protocol testing method will be described in detail in conjunction with drawings and embodiments according to the disclosure.

Figure 1:
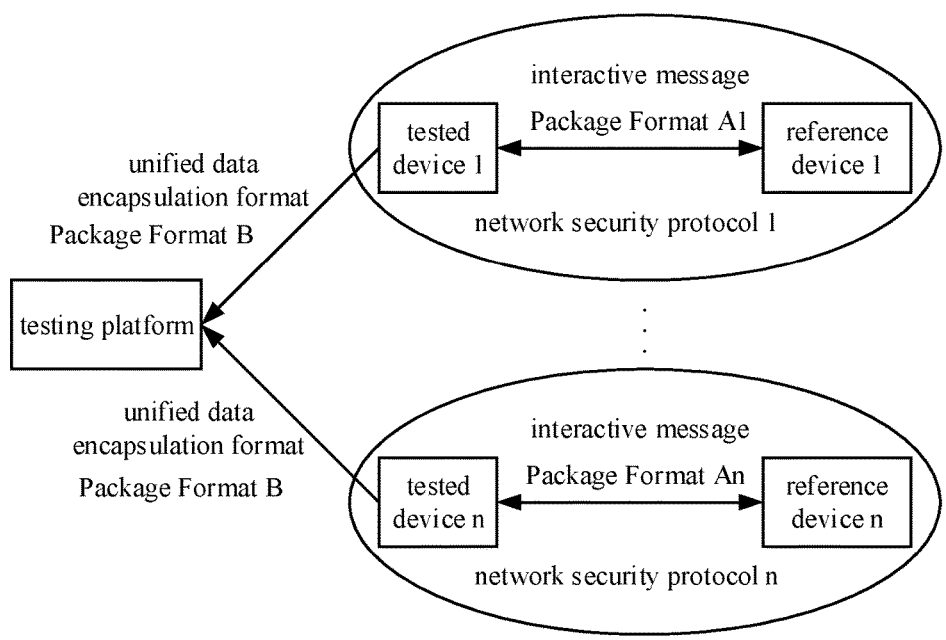
FIG. 1 is a schematic diagram of a testing system according to an embodiment of the disclosure.

The communication protocol testing method provided by the disclosure can achieve the general testing for communication protocols, particularly network security protocols having a common characteristic, thereby decreasing the development cost and improving the reusability of the testing. A unified data encapsulation format Package Format B is defined for the communication protocols having the common characteristic. The method involves a testing system, a schematic diagram of which is shown in FIG. 1. Namely, the method involves a testing platform, a tested device and a reference device. The method is applicable for detecting an execution situation of the tested device where the communication protocol is executed between the tested device and the reference device. The communication protocol is executed between the tested device and the reference device. A message transmitted and/or received by the tested device when executing the communication protocol is referred to as a first message, and the first message is encapsulated in a specific data encapsulation format Package Format A of the communication protocol. In FIG. 1, Package Format A1 represents an encapsulation format of an interactive message, i.e., the first message, when a network security protocol 1 is executed between a tested device 1 and a reference device 1. Similarly, Package Format An represents the encapsulation format of the interactive message, i.e., the first message, when a network security protocol n is executed between a tested device n and a reference device n. The tested device 1 and the tested device n may be a same one device, and the reference device 1 and the reference device n can also be a same one device. In a network security communication protocol, the first message includes an interactive message in the process of establishing a security connection between the tested device and the reference device or an interactive message in the process of performing a data secret communication between the tested device and the reference device, such as an interactive message of RFC 5246TLS handshake protocol and an interactive message of WAI protocol in GB 15629.11-2003/Amd.1-2006WAPI. Both the tested device and the testing platform in the method support a unified data encapsulation format Package Format B.

Figure 2:
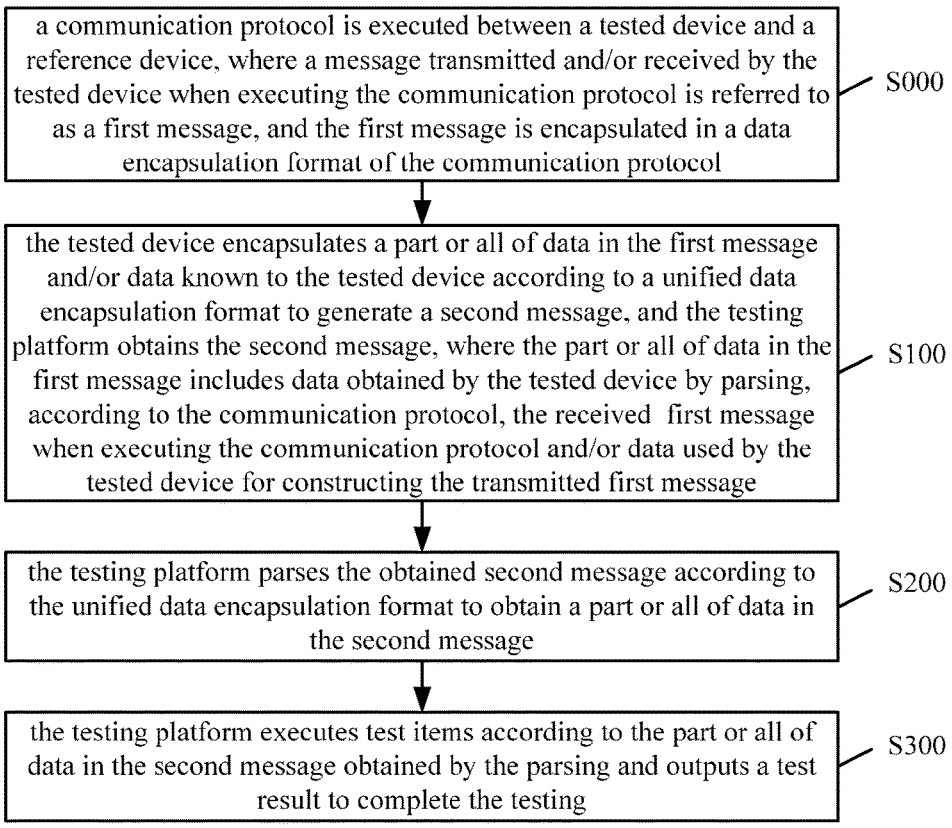
FIG. 2 is a flow chart of a method according to an embodiment of the disclosure.

FIG. 2 is a flow chart of the method, which includes steps S000 to S300.

In step S00, a communication protocol is executed between the tested device and the reference device. A message transmitted and/or received by the tested device when executing the communication protocol is referred to as a first message, and the first message is encapsulated in a data encapsulation format of the communication protocol.

In step S100, the tested device encapsulates a part or all of data in the first message and/or data known to the tested device according to a unified data encapsulation format to generate a second message. The testing platform obtains the second message. The part or all of data in the first message includes data obtained by the tested device by parsing the received first message according to the communication protocol and/or data used by the tested device for constructing the transmitted first message.

In step S200, the testing platform parses the obtained second message according to the unified data encapsulation format to obtain a part or all of data in the second message.

In step S300, the testing platform executes testing items according to the part or all of data in the second message obtained by the parsing and outputs a testing result to complete the testing.

Both the above first message and second message are short for a class of message, and not limited to a specific message.

With the testing method according to the above embodiment, in detecting an execution situation of a tested device where a communication protocol, particularly a series of communication protocols having a common characteristic, such as a network security protocol, is executed between the tested device and a reference device, the development workload of a testing system is largely decreased and the reusability of the testing system is improved, thereby saving the development cost and improving the development efficiency. The execution efficiency of the testing platform is improved without any tool for data capture.

Preferably, the unified data encapsulation format in step S100 is a data encapsulation format supported by a testing platform and is applicable in performing the testing for each of multiple different communication protocols. The reusability of the testing is largely improved by using the unified data encapsulation format in the testing. The unified data encapsulation format is not limited to a specific format. The unified data encapsulation format Package Format B generally consists of a head and a payload shown in Table 1.

TABLE 1

| head | payload |
---

A definition of the payload should be convenient for secondary encapsulation of data of interactive messages of different communication protocols and also should be convenient for the testing platform to parse data so as to correspond to testing items. The payload includes definitions of data elements, and a definition of each data element should be clear and convenient to implement.

A method for defining data elements is as follows. Each data element corresponds to a field in the payload, and the length and meaning of each field are indicated. For example, the definition of the payload is a cascade of field 1, field 2, through field n, and fields have a strict sequential order. In the definition, the length of each of field 1, field 2, field 3 . . . field n (namely, the value of length 1, length 2, length 3 . . . length n) and specific meaning of each field are indicated (as shown in table 2).

TABLE 2

| field 1 | field 2 | field 3 | . . . | field n |
|---------|---------|---------|-------|---------|
| length 1 | length 2 | length 3 | . . . | length n |

In another preferred embodiment for defining data elements, considering that data elements involved in different network security protocols may be different and data elements required by different testing items may also be different, different data elements should be recognized and flexible in the unified data encapsulation format, which does not strictly restrict the sequential order of data elements. In this case, data elements in the payload may be encapsulated in a data element encapsulation format (Type-length-value, TLV), and an encapsulation in the data element encapsulation format includes three fields, which are an element type field, an element length field and an element information field.

The element type field is used to identify what a data element is, such as, identify whether the data element is a random number or a digital certificate.

The element length field is used to identify a length of the data element, which may be a length of the whole TLV format and may also be a length of an element value field.

The element information field has a length assigned by the element length field, and a value representative of content of the data element.

Preferably, in order to further ensure that testing data is real, an original message is further defined in the data element in the unified data encapsulation format. For a tested device, the original message refers to the first message, that is, the second message includes the first message and the first message servers as a data element of the original message, so the testing platform may correspond the testing data to data of the first message, and associate the testing data with the data of the first message for searching and comparing, thereby preventing false data and altered data from being provided by the tested device. For a reference device, the original message refers to a third message described below, that is, a fourth message described below includes the third message and the third message servers as a data element of the original message. In some cases, the testing platform may compare data in the first message carried in the second message with data in the third message carried in the fourth message described below, for determining the authenticity of the testing data.

For a reference device, the original message refers to a fifth message described below, that is, a sixth message described below includes the fifth message and the fifth message serves as a data element of the original message. In some cases, the testing platform may compare data in the first message carried in the second message with data in the fifth message carried in the sixth message described below, for determining the authenticity of the testing data.

A head in the unified data encapsulation format includes some common information, and the head is optional. As shown in table 3, the head in the unified data encapsulation format may be used to identify version information and length information of the unified data encapsulation format, and includes a version field and a length field.

TABLE 3

| ←——— head ———→ | |
|---|---|---|
| version | length | payload |

The version field in Table 3 is used to identify the version information of the unified encapsulation.

The length field in Table 3 is used to identify the length information of a payload, and generally denoted by an octet number. In other embodiments, the other byte than the octet may be adopted.

In order to further extend an identification ability of the head, fields may be added, such as at least one of a device role field, a receiving and transmitting identification field, a manufacturer identification field, a protocol type field, a grouping sequence number field, a fragmenting sequence number field, a fragmenting identification field and other extended fields. The length and meaning of each field should be explicit, and all the fields are an optional field.

The device role field is used to identify a role of the device played in a communication system.

The receiving and transmitting identification field is used to identify whether the device is a receiver or transmitter for an encapsulated message.

The manufacturer identification field is used to distinguish different manufacturers.

The protocol type field is used to distinguish different network security protocols.

The grouping sequence number field is used to identify a grouping sequence number corresponding to the message.

The fragmenting sequence number field is used to identify a fragmenting sequence number after the message is fragmented.

The fragmenting identification field is used to identify whether there is a subsequent fragment.

The extended field is used to further extend the definition.

To make a clear identification, an element length and an element value corresponding to each element type should be defined clearly in the unified data encapsulation format. Element types are uniformly defined to ensure that no element type is repeated.

For example, if a value of the element type is 1, a destination IP address is identified; and if a value of the element type is 2, a source IP address is identified. With the clear definition, when each conformity product of the network security protocol is tested, the destination IP address is encapsulated in TLV format, and the element type is 1; and the source IP address is encapsulated in TLV format, and the element type is 2. In parsing, the testing platform determines that a data element is the destination IP address in a case that the element type of the data element is 1, and the testing platform determines that a data element is the source IP address, in a case that the element type of the data element is 2.

One element type may correspond to one specific field, such as a local random number, a random number of an opposite terminal, a local digital certificate and a digital certificate of the opposite terminal. In this case, each field has an element type, and each field is encapsulated in TLV format, so that the definition of fields is clear, but the encapsulation is long.

Alternatively, one element type may correspond to all fields required by a testing item. The fields required by the testing item are defined in a field cascade way. For example, encryption testing data of a symmetric cryptographic algorithm corresponds to an element type, and then the testing data of the symmetric cryptographic algorithm includes a symmetric cryptographic algorithm identification field, an encryption key field, an initialization vector IV field, a plaintext data field and a cryptograph data field. In such a way, multiple fields whose sequence relationship is clearly defined may use one element type, a concept of group is established, and parsing and testing will be simply if there is a group corresponding to a testing item.

Alternatively, the above two ways may be combined. For some fields used by multiple testing items, or for some identification fields, one element type corresponds to one element type; and for some fields mainly corresponding to some specific testing items, one element type is used collectively. For example, for fields of IP address, MAC address and protocol type, one element type is used individually; for fields related to the encryption testing data of the symmetric cryptographic algorithm, one element type is used collectively; and for testing data related to a signature algorithm, one element type is used collectively.

Based on the above description, the unified data encapsulation format is not limited in embodiments of the disclosure, which may be obtained by those skilled in the art in combination with the above description.

Optionally, the second message obtained by the testing platform in step S100 may be transmitted in an online manner via a USB interface and a RJ45 net port, and may also be imported or exported in a form of xml file or self-defined text file.

The data known to the tested device in step S100 refers to some related data in the unified data encapsulation format which may be submitted to the testing platform. Those related data are messages transmitted or received by the tested device, that is, those related data are not included in the first message, but is known to the tested device, such as keys and digital certificates of the symmetric cryptographic algorithm.

Under some requirements, some data of the tested device cannot be provided to the testing platform even for facilitating the testing, such as a private key of the tested device. In this case, the tested device should support importing a public and private key pair (public key and private key in public key cryptography) from the outside, or directly importing a digital certificate from the outside. The tested device have the public and private key pair imported from the outside or the digital certificate imported from the outside, both aimed at that private information does not need to be provided when the tested device is tested, because those information is available by an information testing platform. The public and private key pair or the digital certificate may be imported from the outside in a form of self-defined text file.

Preferably, in step 200, the testing platform parses the obtained second message according to the unified data encapsulation format to obtain a part or all of data in the second message.

The testing platform may start to parse each time one of the second messages is obtained. Alternatively, the testing platform may start to parse when several of the second messages are obtained.

The parsing may include paring meaning and value of each data field for each message according to the unified data encapsulation format. Alternatively, the parsing may include parsing only the meaning and value of a field related to testing items based on the configuration of the testing items.

Preferably, in step S300, the testing platform executes testing items according to the part or all of data in the second message obtained by the parsing, and outputs a testing result to complete the testing.

The testing platform may correspond to one or more testing item, which may include the testing for cryptographic algorithm and the testing for network security protocol.

Testing items for cryptographic algorithm include SM2 signature algorithm testing item, SM2 key exchange testing item, SM2 public key encryption testing item, GCM-SM4 public encryption testing item, SM3 Hash algorithm testing item, GCM-AES-128 and the like.

Testing items for network security protocol include TAEP data encapsulation testing item, EAP data encapsulation testing item, port access control testing item and the like.

A testing report outputted by the testing platform after the testing may describe what testing items are implemented and whether each testing item passes or does not pass the testing;

and the testing report may include detailed information of each testing item as required. The detailed information includes values of data fields used for those testing items or the corresponding first message.

According to different network security protocols, the number of the reference device may be more than one. In the following embodiments of the disclosure, description is given by taking the number of the reference device being two an example. Namely, the testing system includes the reference device and a second reference device, and the second reference device may also be referred to as an auxiliary device. The auxiliary device is mainly configured to prevent the tested device from providing false or tampered data to the testing platform. That is, the auxiliary device participates in a communication process for testing the tested device, and synchronously provides related data to the testing platform for checking the authenticity of data provided by the tested device. In other words, the testing platform ensures the authenticity of the data provided by the tested device by comparing related data in the data provided by the auxiliary device with that in the data provided by the tested device.

The auxiliary device participates in the executing of a communication protocol. A message transmitted and/or received by the auxiliary device when executing the communication protocol is referred to as a third message, and the third message is encapsulated in a data encapsulation format of the communication protocol.

The auxiliary device encapsulates a part or all of data in the third message and/or data known to the auxiliary device according to a unified data encapsulation format to generate a fourth message. The testing platform obtains the fourth message. The part or all of data in the third message includes data obtained by the auxiliary device by parsing, according to the communication protocol, the received third message when executing the communication protocol, and/or data used by the auxiliary device for constructing the transmitted third message when executing the communication protocol.

The testing platform parses the obtained fourth message according to the unified data encapsulation format to obtain a part or all of data in the fourth message, and uses the obtained part or all of data in the fourth message to assist in the testing.

The detailed process of using the obtained part or all of data in the fourth message to assist in the testing is as follows. The testing platform compares data in data of the fourth message obtained by the testing platform by the parsing with corresponding data in data of the second message obtained by the testing platform by the parsing, and obtains a comparison result. For example, in a specific network security protocol, a random number or a certificate of the tested device exist in both the second message and the fourth message, and the random number or the certificate in the second message is consistent with that in the fourth message, according to description of the network security protocol. Therefore, when obtaining the random number or the certificate in the second message and that in the fourth message, the testing platform should make a comparison to determine a consistence. In a case of a positive determination, it indicates that the second message transmitted by the tested device is authentic; and otherwise, it indicates that the second message transmitted by the tested device is false.

Preferably, the auxiliary device transmits the fourth message to the testing platform in an online manner via a selected USB interface or RJ45 net port, or imports the fourth message to the testing platform in an exporting manner in a form of xml file or self-defined text file.

Both the third message and the fourth message are short for a class of message, and not limited to a specific message.

Both the auxiliary device and the reference device in the above embodiment may be integrated into the testing platform.

Based on the above testing method, testing processes will be described in detail for a topological structure diagram of a series of network security protocols according to the disclosure. For a topological structure of network security protocols shown in FIG. 3, there are three device roles for executing the series of network security protocols, which are requester REQ, authentication access control ACC, and authentication server AS. Specifically, REQ and AAC perform an interaction of message, and AS and AAC perform an interaction of message. The network security protocols based on the topological structure include GB 15629.11-2003/Amd.1-2006 WAPI and the like.

Figure 3:
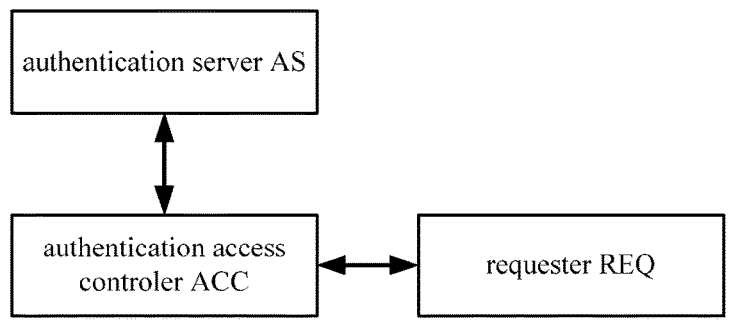
FIG. 3 is a network topological diagram of a communication protocol executed by a tested device according to an embodiment of the disclosure.
Figure 4:
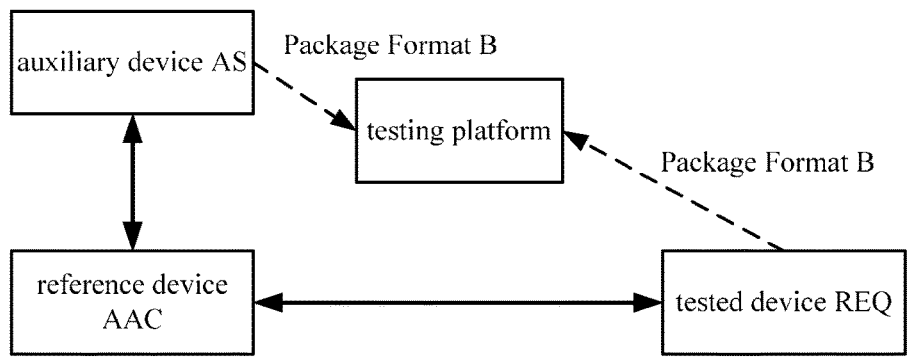
FIG. 4 is a structural diagram of a testing system according to an embodiment of the disclosure.

As shown in FIG. 4, in testing a situation of executing a series of network security protocols shown in FIG. 3, REQ is a tested device, AS is an auxiliary device, AAC is a reference device, and a tested protocol is WAPI protocol. The testing process of the embodiment includes the following step.

A message interaction of WAPI protocol is executed between REQ, AAC and AS.

A message transmitted and/or received by REQ when executing WAPI protocol is referred to as a first message. The first message is encapsulated by using WAPI protocol. REQ encapsulates a part or all of data in the first message and/or data known to REQ according to a unified data encapsulation format Package Format B to generate a second message, and transmits the second message to the testing platform in an online transmission manner, such as via a RJ45 net port or in a file exporting manner, The part or all of data in the first message includes data obtained by REQ by parsing, according to WAPI protocol, the message received when executing the WAPI protocol and/or data used by REQ for constructing the transmitted message when executing the WAPI protocol.

A message transmitted and/or received by AS when executing the communication protocol is referred to as a third message. The third message is encapsulated by using WAPI protocol, which corresponds to Package Format A in FIG. 1. AS encapsulates the obtained part or all of data in the third message and/or data known to AS according to a unified data encapsulation format Package Format B to generate a fourth message. The testing platform obtains the fourth message in an online transmission manner such as via the RJ45 net port or in a file exporting manner. The part or all of data in the third message includes data obtained by AS by parsing, according to WAPI protocol, the third message received when executing the WAPI protocol and/or data used by AS for constructing the transmitted third message when executing the WAPI protocol.

The testing platform parses the obtained second message and fourth message according to the unified data encapsulation format Package Format B, to obtain a part or all of data in the second message and a part or all of data in the fourth message. The part or all of data in the fourth message obtained by the parsing is used to assist in the testing. Specifically, the testing platform compares data, such as REQ random number and AAC random number, in data of the second message obtained by the testing platform by the parsing with corresponding data in data of the fourth message obtained by the testing platform by the parsing, and obtains a comparison result to determine the accuracy of data information submitted by REQ. Then, the testing platform executes testing items based on the parsed part or all of data in the second message, and outputs a testing result to complete the testing.

The details of the above comparison are as follows. According to WAPI protocol, the first message includes a REQ random number and an AAC random number; the third message also includes a REQ random number and an AAC random number; values of the REQ random number and the AAC random number in the first message should be respectively the same with values of the REQ random number and the AAC random number in the third message. In the testing, both the second message and the fourth message include a REQ random number and an AAC random number, and values of the REQ random number and the AAC random number in the second message should be respectively the same with values of the REQ random number and the AAC random number in the fourth message. Therefore, values of the two sets of data may be compared in the testing. If the values are not the same, it indicates that tested data provided by REQ is incorrect; and if the values are the same, it indicates that the tested data provided by REQ is correct, and in this case, the tested data may be used to execute the testing items and a testing result is outputted to complete the testing.

Figure 5:
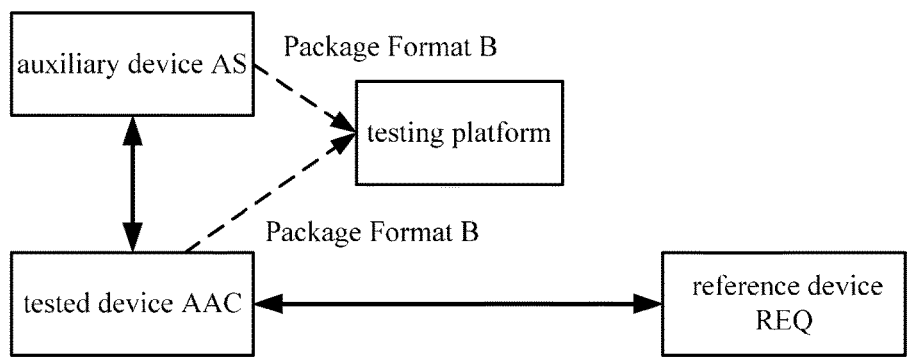
FIG. 5 is a structural diagram of another testing system according to an embodiment of the disclosure.

As shown in FIG. 5, in testing a situation of executing a series of network security protocols shown in FIG. 3, REQ is a tested device, AS is an auxiliary device, and REQ is a reference device. The testing process of the embodiment includes the following step.

A message interaction of a tested communication protocol is executed between REQ, AAC and AS. A message transmitted and/or received by AAC when executing the message interaction of the tested communication protocol is referred to as a first message. The first message is encapsulated by using the tested communication protocol. AAC encapsulates a part or all of data in the first message and/or data known to AAC according to a unified data encapsulation format Package Format B to generate a second message. The testing platform obtains the second message in an online transmission manner such as via a RJ45 net port or in a file exporting manner.

A message transmitted and/or received by AS when executing the message interaction of the tested communication protocol is referred to as a third message. The third message is encapsulated by using the tested communication protocol. AS encapsulates the part or all of data in the third message and/or data known to AS according to the unified data encapsulation format Package Format B to generate a fourth message. The testing platform obtains the fourth message in an online transmission manner such as via the RJ45 net port or in a file exporting manner.

The testing platform parses the obtained second message and fourth message according to the unified data encapsulation format Package Format B, to obtain a part or all of data in the second message and a part or all of data in the fourth message. The part or all of data in the fourth message obtained by the parsing is used to assist in the testing. Specifically, the testing platform compares data in data of the fourth message obtained by the testing platform by the parsing with corresponding data in data of the second message obtained by the testing platform by the parsing, and obtains a comparison result to determine the accuracy of data information submitted by AAC. Then, the testing platform executes testing items based on the parsed part or all of data in the second message, and outputs a testing result to complete the testing.

Figure 6:
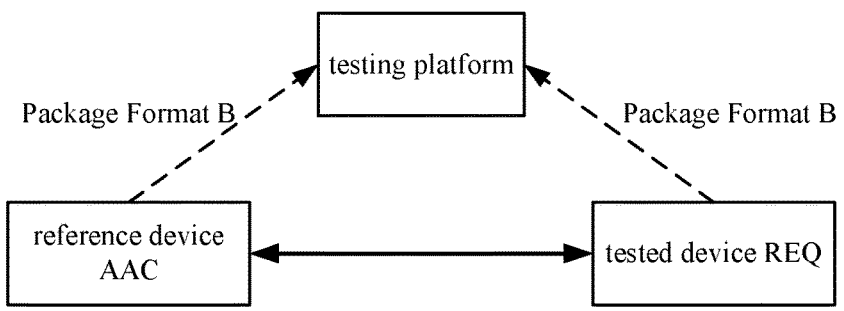
FIG. 6 is a schematic diagram of a testing system according to an embodiment of the disclosure.

In some scenes, there is only the reference device, namely there is no auxiliary device. In this case, only with the tested device and the reference device, the testing platform cannot obtain data used to assist in the testing from the auxiliary device. To further ensure the authenticity of testing data, the testing platform obtains assistance testing data from the reference device, in addition to obtain testing data from the tested device. A corresponding testing topology is shown in FIG. 6. The testing process of the embodiment includes following steps.

The tested device and the reference device perform a message interaction of a specific communication protocol.

A message transmitted and/or received by the tested device when executing the specific communication protocol is referred to as a first message. The first message is encapsulated by using the specific communication protocol, which corresponds to Package Format A in FIG. 1. The tested device encapsulates a part or all of data in the first message and/or data known to the tested device according to a unified data encapsulation format Package Format B to generate a second message. The testing platform obtains the second message in an online transmission manner such as via a RJ45 net port or in a file exporting manner. The part or all of data in the first message includes data obtained by the tested device by parsing, according to the specific communication protocol, the message received when executing the specific communication protocol and/or data used by the tested device for constructing the transmitted message when executing the specific communication protocol.

A message transmitted and/or received by the reference device when executing the specific communication protocol is referred to as a fifth message. The fifth message is encapsulated by using the specific communication protocol, which corresponds to Package Format A in FIG. 1. The reference device encapsulates the obtained part or all of data in the fifth message and/or data known to the reference device according to a unified data encapsulation format Package Format B to generate a sixth message. The testing platform obtains the sixth message in an online transmission manner such as via the RJ45 net port or in a file exporting manner. The part or all of data in the fifth message includes data obtained by the reference device by parsing, according to the specific communication protocol, the fifth message received when executing the specific communication protocol and/or data used by the reference device for constructing the transmitted fifth message when executing the specific communication protocol.

The testing platform parses the obtained second message and sixth message according to the unified data encapsulation format Package Format B, to obtain a part or all of data in the second message and a part or all of data in the sixth message. The part or all of data in the sixth message obtained by the parsing is used to assist in the testing. Specifically, the testing platform compares data, such as a random number of the tested device and a random number of the reference device, in data of the second message obtained by the testing platform by the parsing with corresponding data in data of the sixth message obtained by the testing platform by the parsing, and obtains a comparison result to determine the accuracy of data information submitted by the tested device. Then, the testing platform executes testing items on the parsed part or all of data in the second message, and outputs a testing result to complete the testing.

Based on the above inventive concept, a tested device and a testing platform are further provided according to embodiments of the disclosure. Since principles that the tested device and the testing platform solve problems are similar to that in the above-described testing method, descriptions of repeated portions will be omitted.

Figure 7:
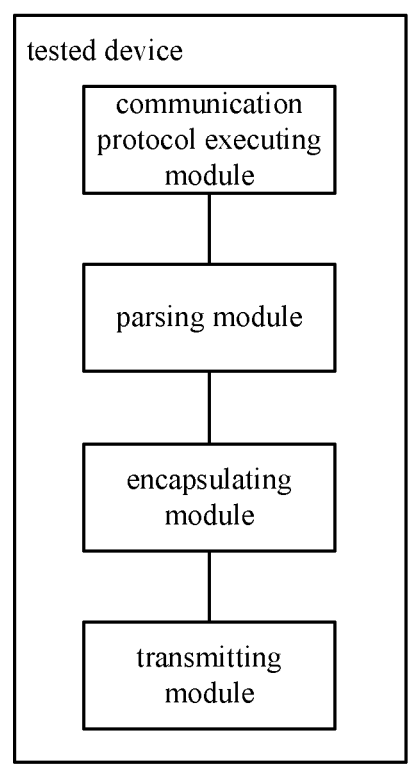
FIG. 7 is a structural schematic diagram of a tested device according to the disclosure.

A tested device is provided according to an embodiment of the disclosure as shown in FIG. 7, which includes a communication protocol executing module, a parsing module, an encapsulating module and a transmitting module.

The communication protocol executing module is configured to execute a communication protocol with a reference device. A message transmitted and/or received by the communication protocol executing module when executing the communication protocol is referred to as a first message, and the first message is encapsulated in a data encapsulation format of the communication protocol.

The parsing module is configured to parse the received first message according to the communication protocol to obtain data.

The encapsulating module is configured to encapsulate a part or all of data in the first message and/or data known to the tested device according to a unified data encapsulation format to generate a second message. The part or all of data in the first message are data obtained by the parsing module by parsing the received first message and/or data used by the parsing module for constructing the transmitted first message.

The transmitting module is configured to transmit the second message to the testing platform.

Preferably, the unified data encapsulation format is a data encapsulation format supported by the testing platform, and the unified data encapsulation format is applicable in performing the testing for each of multiple different communication protocols.

Figure 8:
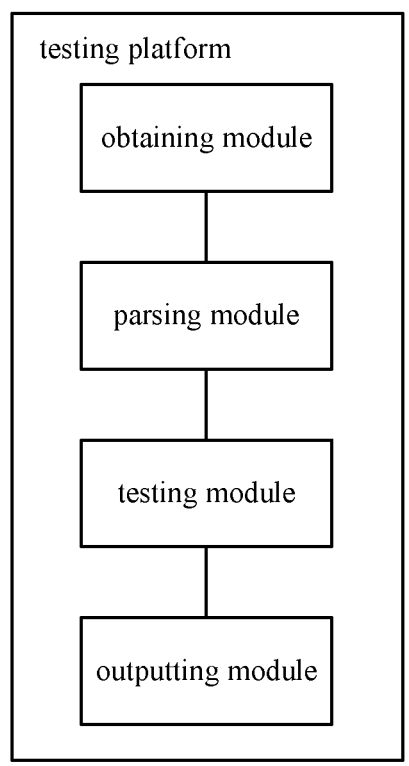
FIG. 8 is a structural schematic diagram of a tested platform according to the disclosure.

A testing platform is provided according to an embodiment of the disclosure as shown in FIG. 8, which includes an obtaining module, a parsing module, a testing module and an outputting module.

The obtaining module is configured to obtain a second message transmitted by the tested device.

The parsing module is configured to parse the obtained second message according to a unified data encapsulation format to obtain a part or all of data in the second message.

The testing module is configured to execute testing items according to the part or all of data in the second message obtained by the parsing.

The outputting module is configured to output a testing result provided by the testing module.

Preferably, if an auxiliary device participates in the testing, the obtaining module is further configured to obtain a fourth message transmitted by the auxiliary device. The parsing module is further configured to parse the obtained fourth message according to a unified data encapsulation format to obtain a part or all of data in the fourth message. The testing module is further configured to use the part or all of data in the fourth message obtained by the parsing to assist in the testing.

Preferably, the detailed process of using the part or all of data in the fourth message obtained by the parsing to assist in the testing by the testing module is as follows. The testing module compares data in data of the fourth message obtained by the parsing module by the parsing with corresponding data in data of the second message obtained by the parsing module by the parsing, and obtains a comparison result.

Preferably, if only a reference device but not the auxiliary device participates in the testing, the obtaining module is further configured to obtain a sixth message transmitted by the reference device. The parsing module is further configured to parse the obtained sixth message according to a unified data encapsulation format to obtain a part or all of data in the sixth message. The testing module is further configured to use the part or all of data in the sixth message obtained by the parsing to assist in the testing.

Preferably, the detailed process of using the part or all of data in the sixth message obtained by the parsing to assist in the testing by the testing module is as follows. The testing module compares data in data of the sixth message obtained by the parsing module by the parsing with corresponding data in data of the second message obtained by the parsing module by the parsing, and obtains a comparison result.

The testing method and tested device and testing platform thereof according to the disclosure are described in detail as above. Specific embodiments are used in the specification to illustrate principles and forms of execution of the disclosure. The above embodiments are only intended to assist in understanding methods of the disclosure and core concepts thereof. For those skilled in the art, changes will be made to specific embodiments and an application scope according to the concepts of the disclosure. In conclusion, content of the specification should not be construed as limiting the invention.

The invention claimed is:

1. A method for testing a communication protocol, involving a testing platform, a tested device and a reference device, for detecting an execution situation of the tested device when the communication protocol is executed between the tested device and the reference device, the method comprising:

executing, by the tested device and the reference device, the communication protocol, wherein a message transmitted and/or received by the tested device when executing the communication protocol is referred to as a first message, and the first message is encapsulated in a data encapsulation format of the communication protocol;

encapsulating, by the tested device, a part or all of data in the first message according to a unified data encapsulation format to generate a second message, or encapsulating, by the tested device, a part or all of data in the first message and data known to the tested device according to a unified data encapsulation format to generate a second message; and obtaining the second message by the testing platform, wherein the part or all of data in the first message comprises data obtained by the tested device by parsing the received first message according to the communication protocol and/or data used by the tested device for constructing the transmitted first message;

parsing, by the testing platform, the obtained second message according to the unified data encapsulation format to obtain a part or all of data in the second message; and executing, by the testing platform, testing items according to the part or all of data in the second message obtained by the parsing, and outputting, by the testing platform, a testing result to complete the testing.

2. The method according to claim 1, wherein the method further involves an auxiliary device, the auxiliary device participates in the process of executing the communication protocol, a message transmitted and/or received by the auxiliary device when executing the communication protocol is referred to as a third message, and the third message is encapsulated in a data encapsulation format of the communication protocol;

the auxiliary device encapsulates a part or all of data in the third message to the unified data encapsulation format to generate a fourth message, the testing platform obtains the fourth message, or the auxiliary device encapsulates a part or all of data in the third message and data known to the auxiliary device according to the unified data encapsulation format to generate a fourth message; and the testing platform obtains the fourth message, and the part or all of data in the third message comprises data obtained by the auxiliary device by parsing the received third message according to the communication protocol and/or data used by the auxiliary device for constructing the transmitted third message;

the testing platform parses the obtained fourth message according to the unified data encapsulation format to obtain a part or all of data in the fourth message, and uses the obtained part or all of data in the fourth message to assist in the testing; and the using of the part or all of data in the fourth message by the testing platform to assist in the testing comprises: comparing, by the testing platform, data in data of the fourth message obtained by the parsing with corresponding data in data of the second message obtained by the parsing, and obtaining a comparison result by the testing platform.

3. The method according to claim 2, wherein the unified data encapsulation format is a data encapsulation format supported by the testing platform, and the unified data encapsulation format is applicable in performing the testing for each of a plurality of different communication protocols.

4. The method according to claim 3, wherein the unified data encapsulation format comprises a payload;

the payload comprises data elements defined therein, and each of the data elements in the payload is encapsulated in a data element encapsulation format comprising three fields, which comprise an element type, an element length and an element information; and the element type identifies a specific data, or the element type identifies all data needed by a testing item.

5. The method according to claim 4, wherein the data element defined in the payload further comprises an original message, which is the first message or the third message.

6. The method according to claim 5, wherein the unified data encapsulation format further comprises a head, the head comprises a version field and a length field of the unified data encapsulation format, and the head further comprises one or more of a device role field, a receiving and transmitting identification field, a manufacturer identification field, a protocol type field, a grouping sequence number field, a fragmenting sequence number field, a fragmenting identification field and an extended field.

7. The method according to claim 2, wherein the obtaining the fourth message by the testing platform comprises transmitting, by the tested device, the fourth message to the testing platform in an online manner, or importing, by the tested device, the fourth message to the testing platform in a file exporting manner.

8. The method according to claim 2, wherein the auxiliary device is integrated into the testing platform.

9. The method according to claim 1, wherein a message transmitted and/or received by the reference device when a communication protocol is executed between the reference device and the tested device is referred to as a fifth message, and the fifth message is encapsulated in a data encapsulation format of the communication protocol;

the reference device encapsulates a part or all of data in the fifth message according to a unified data encapsulation format to generate a sixth message, or the reference device encapsulates a part or all of data in the third message and data known to the reference device according to a unified data encapsulation format to generate a sixth message;

the testing platform obtains the sixth message, and the part or all of data in the fifth message comprises data obtained by the reference device by parsing the received fifth message according to the communication protocol and/or data used by the reference device for constructing the transmitted fifth message;

the testing platform parses the obtained sixth message according to the unified data encapsulation format to obtain a part or all of data in the sixth message, and uses the obtained part or all of data in the sixth message to assist in the testing; and the using of the part or all of data in the sixth message by the testing platform to assist in the testing comprises: comparing, by the testing platform, data in data of the sixth message obtained by the parsing with corresponding data in data of the second message obtained by the parsing, and obtaining a comparison result by the testing platform.

10. The method according to claim 9, wherein the obtaining the sixth message by the testing platform comprises transmitting, by the tested device, the sixth message to the testing platform in an online manner, or importing, by the tested device, the sixth message to the testing platform in a file exporting manner.

11. The method according to claim 9, wherein the unified data encapsulation format is a data encapsulation format supported by the testing platform, and the unified data encapsulation format is applicable in performing the testing for each of a plurality of different communication protocols.

12. The method according to claim 11, wherein the unified data encapsulation format comprises a payload;

the payload comprises data elements defined therein, and each of the data elements in the payload is encapsulated in a data element encapsulation format comprising three fields, which comprise an element type, an element length and an element information; and the element type identifies a specific data, or the element type identifies all data needed by a testing item.

13. The method according to claim 12, wherein the data element defined in the payload further comprises an original message, which is the first message or the third message.

14. The method according to claim 13, wherein the unified data encapsulation format further comprises a head, the head comprises a version field and a length field of the unified data encapsulation format, and the head further comprises one or more of a device role field, a receiving and transmitting identification field, a manufacturer identification field, a protocol type field, a grouping sequence number field, a fragmenting sequence number field, a fragmenting identification field and an extended field.

15. The method according to claim 1, wherein the obtaining the part or all of data in the first message of the second message by the testing platform comprises parsing data in one of the second messages according to the unified data encapsulation format, or parsing data in several of the second messages according to the unified data encapsulation format.

16. The method according to claim 1, wherein the obtaining the second message by the testing platform comprises transmitting, by the tested device, the second message to the testing platform in an online manner, or importing, by the tested device, the second message to the testing platform in a file exporting manner.

17. The method according to claim 1, wherein the reference device is integrated into the testing platform.

18. A tested device, wherein an execution situation of the tested device is detected by a testing platform when a communication protocol is executed between the tested device and a reference device; wherein the tested device comprises a non-transitory storage medium having a plurality of instructions stored thereon that, when executed by the tested device, cause the tested device to:

execute a communication protocol with the reference device, wherein a message transmitted and/or received by the tested device when executing the communication protocol is referred to as a first message, and the first message is encapsulated in a data encapsulation format of the communication protocol;

parse the received first message according to the communication protocol to obtain data;

encapsulate a part or all of data in the first message according to a unified data encapsulation format to generate a second message, or encapsulate a part or all of data in the first message and data known to the tested device according to a unified data encapsulation format to generate a second message;

wherein the part or all of data in the first message comprises data obtained by the tested device by parsing the received first message and/or data used by the tested device for constructing the transmitted first message; and transmit the second message to the testing platform.

19. The tested device according to claim 18, wherein the unified data encapsulation format is a data encapsulation format supported by the testing platform, and the unified data encapsulation format is applicable in performing the testing for each of a plurality of different communication protocols.

20. A testing platform for detecting an execution situation of a tested device when a communication protocol is executed between the tested device and a reference device, comprising a non-transitory storage medium having a plurality of instructions stored thereon that, when executed by the testing platform, cause the testing platform to:

obtain a second message generated by the tested device;

parse the obtained second message according to a unified data encapsulation format to obtain a part or all of data in the second message;

execute testing items according to the part or all of data in the second message obtained by the parsing; and output a testing result.

21. The testing platform according to claim 20, wherein the plurality of instructions, when executed by the testing platform, further cause the testing platform to:

obtain a fourth message transmitted by an auxiliary device;

parse the obtained fourth message according to a unified data encapsulation format to obtain a part or all of data in the fourth message; and use the part or all of data in the fourth message obtained by the parsing to assist in the testing.

22. The testing platform according to claim 21, wherein the plurality of instructions, when executed by the testing platform, further cause the testing platform to perform following operations for the use the part or all of data in the fourth message obtained by the parsing to assist in the testing:

compare data in data of the fourth message obtained by the parsing with corresponding data in data of the second message obtained by the parsing, and obtain a comparison result.

23. The testing platform according to claim 20, wherein the plurality of instructions, when executed by the testing platform, further cause the testing platform to:

obtain a sixth message transmitted by the reference device;

parse the obtained sixth message according to a unified data encapsulation format to obtain a part or all of data in the sixth message; and use the part or all of data in the sixth message obtained by the parsing to assist in the testing.

24. The testing platform according to claim 23, wherein the plurality of instructions, when executed by the testing platform, further cause the testing platform to perform following operations for the use the part or all of data in the fourth message obtained by the parsing to assist in the testing:

compare data in data of the sixth message obtained by the parsing with corresponding data in data of the second message obtained by the parsing, and obtain a comparison result.

* * * * *